United States Patent
Zhang

(10) Patent No.: US 10,430,630 B2
(45) Date of Patent: Oct. 1, 2019

(54) ELECTRONIC DEVICE

(71) Applicant: GUANGDONG OPPO MOBILE TELECOMMUNICATIONS CORP., LTD., Dongguang, Guangdong (CN)

(72) Inventor: Haiping Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 37 days.

(21) Appl. No.: 15/928,694

(22) Filed: Mar. 22, 2018

(65) Prior Publication Data
US 2018/0336391 A1 Nov. 22, 2018

(30) Foreign Application Priority Data
May 22, 2017 (CN) .......................... 2017 1 0366590

(51) Int. Cl.
*G06K 9/00* (2006.01)
*H04M 1/02* (2006.01)
(Continued)

(52) U.S. Cl.
CPC ....... *G06K 9/00013* (2013.01); *G06F 1/1626* (2013.01); *G06F 1/1652* (2013.01);
(Continued)

(58) Field of Classification Search
CPC . G06K 9/00013; G06F 1/1626; G06F 1/1652; G06F 1/1684; G06F 3/0412;
(Continued)

(56) References Cited

U.S. PATENT DOCUMENTS

| | | | |
|---|---|---|---|
| 10,254,863 B2* | 4/2019 | Shin | G06F 1/1616 |
| 2010/0277859 A1* | 11/2010 | Wang | G06F 1/1626 361/679.21 |

(Continued)

FOREIGN PATENT DOCUMENTS

| | | |
|---|---|---|
| CN | 104683561 A | 6/2015 |
| CN | 104866223 A | 8/2015 |

(Continued)

OTHER PUBLICATIONS

PCT/CN2018/079192 International Search Report and Written Opinion dated Jun. 1, 2018, 9 pp.
(Continued)

*Primary Examiner* — Jonathan S Lee
(74) *Attorney, Agent, or Firm* — Lathrop Gage LLP

(57) ABSTRACT

An electronic device is provided and includes a flexible display screen, a fingerprint identification module and a housing. The housing has a top face and a side face connected with each other, the side face is provided with a mounting groove, the fingerprint identification module is accommodated in the mounting groove. The flexible display screen includes a fixed portion and a movable portion connected with each other, the fixed portion being fitted to the top face, and the movable portion extending beyond the top face. When the movable portion is bent relative to the fixed portion, the movable portion covers the side face and the fingerprint identification module performs fingerprint identification through the flexible display screen. When the movable portion is spread out relative to the fixed portion, the fingerprint identification module is exposed out of the flexible display screen.

20 Claims, 3 Drawing Sheets

(51) Int. Cl.
*G06F 1/16* (2006.01)
*H04M 1/67* (2006.01)
*G06F 3/041* (2006.01)

(52) U.S. Cl.
CPC ........ *G06F 1/1684* (2013.01); *H04M 1/0268* (2013.01); *G06F 3/0412* (2013.01); *G06F 2203/04102* (2013.01); *H04M 1/026* (2013.01); *H04M 1/67* (2013.01)

(58) Field of Classification Search
CPC ...... G06F 2203/04102; H04M 1/0268; H04M 1/026; H04M 1/67
USPC .......................................................... 382/124
See application file for complete search history.

(56) References Cited

U.S. PATENT DOCUMENTS

| | | | |
|---|---|---|---|
| 2014/0262848 A1* | 9/2014 | Fathollahi | A45C 11/00 206/37 |
| 2015/0331454 A1* | 11/2015 | Song | G06F 1/1652 345/156 |
| 2016/0109973 A1* | 4/2016 | Kim | G06F 3/041 |
| 2016/0112086 A1* | 4/2016 | Lei | H04B 1/3888 455/566 |
| 2016/0179236 A1* | 6/2016 | Shin | G06F 1/1616 |

FOREIGN PATENT DOCUMENTS

| | | |
|---|---|---|
| CN | 105068685 A | 11/2015 |
| CN | 105138074 A | 12/2015 |
| CN | 105872138 A | 8/2016 |
| CN | 106662900 A | 5/2017 |
| CN | 107257396 A | 10/2017 |
| CN | 107291155 A | 10/2017 |
| TW | I490789 B | 7/2015 |
| WO | WO 2015083906 A1 | 6/2015 |

OTHER PUBLICATIONS

European Patent Application No. 18161010.6, Extended Search and Opinion dated Aug. 30, 2018, 7 pages.
Taiwan Patent Application No. 107102877, Office Action with English translation dated Jan. 11, 2019, 6 pages.
Chinese Patent Application No. 201710366590.3 English translation of Office Action dated Mar. 4, 2019, 4 pages.
Chinese Patent Application No. 201710366590.3 Office Action dated Mar. 4, 2019, 5 pages.

* cited by examiner

ELECTRONIC DEVICE

CROSS-REFERENCE TO RELATED APPLICATION

This application claims priority to and benefits of Chinese Patent Application No. 201710366590.3, filed with State Intellectual Property Office on May 22, 2017, the entire content of which is incorporated herein by reference.

FIELD

The present disclosure relates to a technical field of devices, and more particularly to an electronic device.

BACKGROUND

Currently, fingerprint identification technology is widely used, not only in access control and attendance system, but also in other market applications, such as laptops, mobile phones, cars, bank payments, etc.

Taking a mobile phone as an example, a fingerprint identification module and a display screen are designed in a superposed manner, which facilitates increase of a screen-to-body ratio of the mobile phone. Meanwhile, a flexible display screen may enlarge an image display area of an electronic device to realize large screen display.

SUMMARY

An embodiment of the present disclosure provides an electronic device. The electronic device includes a flexible display screen, a fingerprint identification module and a housing. The housing has a top face and a side face connected with each other, the side face is provided with a mounting groove, the fingerprint identification module is accommodated in the mounting groove. The flexible display screen includes a fixed portion and a movable portion connected with each other, the fixed portion being fitted to the top face, and the movable portion extending beyond the top face. When the movable portion is bent relative to the fixed portion, the movable portion covers the side face and the fingerprint identification module performs fingerprint identification through the flexible display screen. When the movable portion is spread out relative to the fixed portion, the fingerprint identification module is exposed out of the flexible display screen such that a finger is fitted to the side face to perform the fingerprint identification.

Another embodiment provides another electronic device. The electronic device includes a flexible display screen, fingerprint identification modules and a housing. The housing has a top face, a peripheral face and a bottom face connected with each other sequentially, the peripheral face and the bottom face each define a mounting groove, the fingerprint identification modules are accommodated in mounting grooves. The flexible display screen includes a fixed portion and a movable portion connected with each other, the fixed portion is fitted to the top face, and the movable portion extends beyond the top face.

Still another embodiment provides still another electronic device. The electronic device includes an organic light-emitting diode display panel, a fingerprint identification module and a housing. The housing has a top face and a side face connected with each other, the side face defining a mounting groove, the fingerprint identification module is accommodated in the mounting groove. The organic light-emitting diode display panel includes a fixed portion and a movable portion connected with each other, the fixed portion is fitted to the top face, and the movable portion extends beyond the top face, and the fingerprint identification module has a signal-acquiring surface parallel to the organic light-emitting diode display panel.

BRIEF DESCRIPTION OF THE DRAWINGS

To describe technical solutions of the present disclosure more clearly, the following will briefly introduce the accompanying drawings required for the description of the embodiments. Obviously, the accompanying drawings described below only show some embodiments of the present disclosure, and those skilled in the art can obtain other drawings based on these drawings without paying creative efforts.

DETAILED DESCRIPTION

Embodiments of the present invention will be described with reference to the accompanying drawings.

In the present invention, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the term "a plurality of" means two or more than two, unless specified otherwise.

In addition, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In an embodiment, an electronic device is provided. The electronic device includes a flexible display screen, a fingerprint identification module and a housing. The housing has a top face and a side face connected with each other, the side face defines a mounting groove, and the fingerprint identification module is accommodated in the mounting groove. The flexible display screen includes a fixed portion and a movable portion connected with each other, the fixed portion is fitted to the top face, and the movable portion extends beyond the top face. When the movable portion is bent relative to the fixed portion, the movable portion covers the side face and the fingerprint identification module performs fingerprint identification through the flexible display screen. When the movable portion is spread out relative to the fixed portion, the fingerprint identification module is exposed out of the flexible display screen, such that a finger is fitted to the side face to perform the fingerprint identification.

Figure 1:
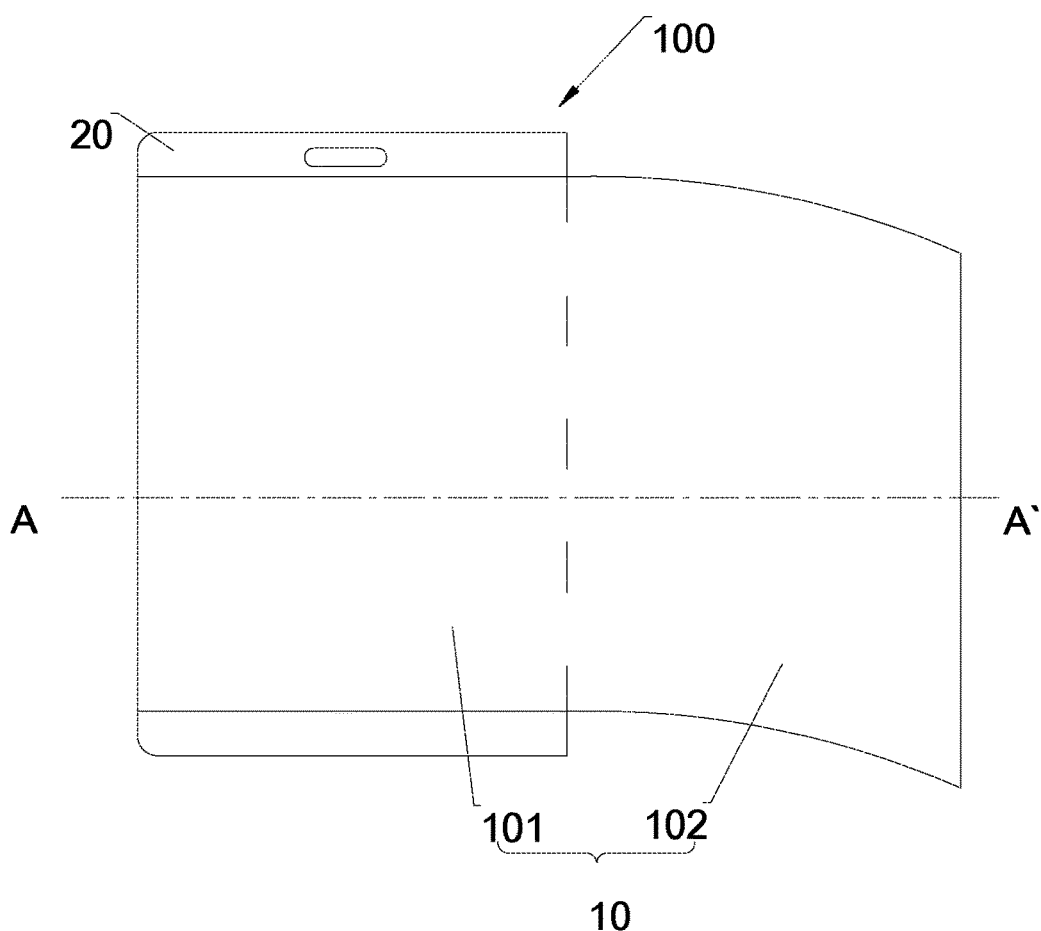
FIG. 1 is a schematic view of an electronic device according to embodiments of the present disclosure.

FIG. 1 illustrates an electronic device 100 according to embodiments of the present disclosure. The electronic device 100 can be a portable electronic device or a communication device having a flexible display screen 10, such as a smart phone, a personal digital assistant (PDA), a tablet computer, a notebook computer, a wearable device or other mobile terminals, but the electronic device 100 is not limited thereto.

Figure 2:
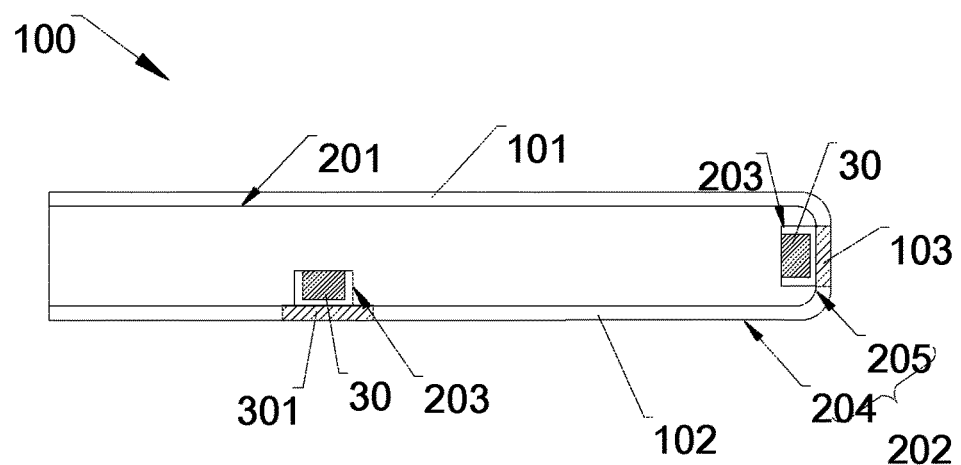
FIG. 2 is a sectional view of an electronic device according to embodiments of the present disclosure, which is taken along line A-A' when a flexible display screen is in a folded state.

FIG. 2 illustrates that the electronic device 100 includes the flexible display screen 10, a fingerprint identification module 30 and a housing 20. The housing 20 has a top face 201 and a side face 202 connected with each other, and the top face 201 is arranged facing a user and configured to bear the flexible display screen 10. The side face 202 defines a mounting groove 203, the mounting groove 203 has an opening 208 facing an exterior of the housing 20, and the mounting groove 203 is configured to accommodate the fingerprint identification module 30. The flexible display screen 10 includes a fixed portion 101 and a movable portion 102 connected with each other, the fixed portion 101 is fitted to the top face 201, and the movable portion 102 extends beyond the top face 201. When the movable portion 102 is bent relative to the fixed portion 101, the movable portion 102 covers the side face 202, and thus the fingerprint identification module 30 performs fingerprint identification through the flexible display screen 10. When the movable portion 102 is spread out relative to the fixed portion 101, the fingerprint identification module 30 is exposed out of the flexible display screen 10, such that a finger can be fitted to the side face 202 to perform the fingerprint identification. In this embodiment, the fact that the movable portion 102 covers the side face 202 means that the movable portion 102 is in contact with the side face 202, but the fit between the movable portion 102 and the side face 202 is different from the fit between the fixed portion 101 and the top face 201, the former is movable fit, i.e. mutual contact between surfaces, and the latter is fixed fit, i.e. fixation between surfaces.

In an embodiment, during assembly of the electronic device 100, the fingerprint identification module 30 can be mounted into the mounting groove 203 in the side face 202 of the housing 20, and the fixed portion 101 of the flexible display screen 10 is fitted to the top face 201 of the housing 20, and the top face 201 of the housing 20 serves as a bearing surface of the flexible display screen 10. The movable portion 102 of the flexible display screen 10 is freely bendable, such that the flexible display screen 10 can be unfolded to become a large display screen, or the flexible display screen 10 can be folded for storage and carrying. When the movable portion 102 is bent relative to the fixed portion 101, the movable portion 102 covers the side face 202, and hence the fingerprint identification module 30 is arranged between the flexible display screen 10 and the housing 20. In such a case, when the user puts the finger on an area of the flexible display screen 10 corresponding to the fingerprint identification module 30, the fingerprint identification module 30 emits an optical signal through the flexible display screen 10, the optical signal is reflected by a fingerprint and then penetrates through the flexible display screen 10 to be received by the fingerprint identification module 30, so as to realize fingerprint acquisition and identification for the user. When the movable portion 102 is spread out relative to the fixed portion 101, the flexible display screen 10 is spread in a plane where the top face 201 is located, the fingerprint identification module 30 is exposed out of the flexible display screen 10, and the user can directly put the finger on the fingerprint identification module 30 to realize the fingerprint identification.

Since the fingerprint identification module 30 is arranged outside the top face 201 of the housing 20, the flexible display screen 10 is directly fitted to the top face 201 of the housing 20 during the assembly of the electronic device 100, such that the fingerprint identification module 30 will not hinder the fixation between the flexible display screen 10 and the housing 20, thereby improving installation flatness of the flexible display screen 10. Additionally, when the flexible display screen 10 is in a folded state, the fingerprint identification module 30 and the flexible display screen 10 are superposed, increasing a screen-to-body ratio of the electronic device 100. When the flexible display screen 10 is in the folded state, the user performs the fingerprint identification through the flexible display screen 10, and when the flexible display screen 10 is in an unfolded state, the user directly puts his finger on the housing 20 to realize the fingerprint identification. The flexible display screen 10 enables different fingerprint identification manners in the unfolded and folded states, which increases enjoyment and improves user experience.

In an embodiment, the fingerprint identification module 30 is an optical fingerprint identification module 30 that identifies a fingerprint image by means of an optical signal. The optical signal identified by the fingerprint identification module 30 can be emitted by the fingerprint identification module 30 itself, and then can be reflected by the user's finger after penetrating through the flexible display screen 10. Or the optical signal identified by the fingerprint identification module 30 can emitted by the flexible display screen 10, then can be reflected by the user's finger, and the reflected light penetrates through the flexible display screen 10 and enters the fingerprint identification module 30. Certainly, in other embodiments, the fingerprint identification module 30 can be a capacitive fingerprint identification module 30, an ultrasonic fingerprint identification module 30, or the like.

Optionally, the flexible display screen 10 is a bendable display panel. The flexible display screen 10 can be a touch screen to realize display and touch control functions simultaneously. The flexible display screen 10 can be an organic light-emitting diode (OLED) display panel.

In an embodiment, FIG. 2 illustrates that the side face 202 includes a bottom face 204 and a peripheral face 205, the bottom face 204 is arranged opposite to the top face 201, and the peripheral face 205 is connected between the top face 201 and the bottom face 204. Optionally, the mounting groove 203 can be defined in the side face 202 or the bottom face 204. A plurality of mounting grooves 203 can be provided. The plurality of mounting grooves 203 can be defined in the side face 202 and/or the bottom face 204. A plurality of fingerprint identification modules 30 are arranged in the plurality of mounting grooves 203.

Figure 3:
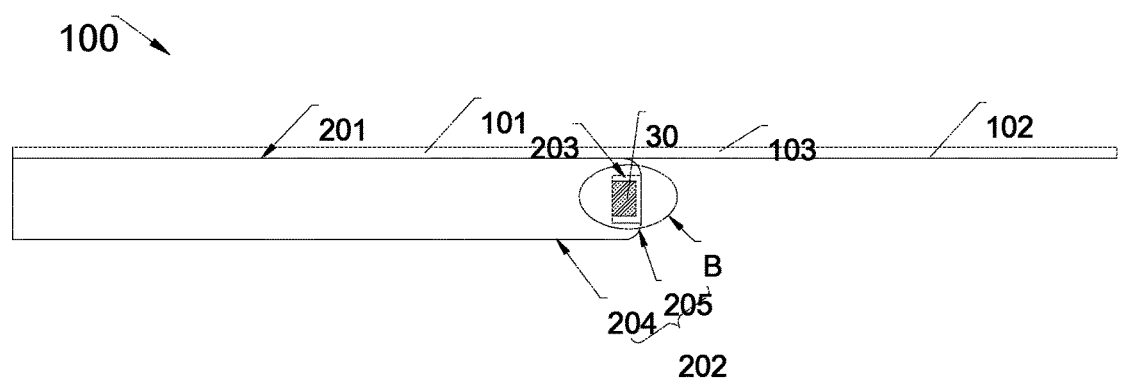
FIG. 3 is a sectional view of an electronic device according to embodiments of the present disclosure, which is taken along line A-A' when a flexible display screen is in an unfolded state.

FIG. 3 illustrates an embodiment, the mounting groove 203 is defined in the peripheral face 205 of the housing 20. When the flexible display screen 10 is in the unfolded state, the flexible display screen 10 is spread out in the plane where the top face 201 is located, and since the peripheral face 205 intersects with the top face 201, the flexible display screen 10 will not cover the peripheral face 205 and hence the fingerprint identification module 30 is exposed out of the flexible display screen 10.

When the flexible display screen 10 is in the folded state, the movable portion 102 is bent towards the peripheral face 205 relative to the fixed portion 101 and covers the peripheral face 205. In such a case, the movable portion 102 can be fitted to the peripheral face 205, and the fingerprint identification module 30 is arranged between the housing 20 and the flexible display screen 10 and performs fingerprint acquisition through the flexible display screen 10.

It could be understood that the flexible display screen 10 in an embodiment may have a light-transmitting area 103, and when the movable portion 102 covers the side face 202, the light-transmitting area 103 is right opposite to the mounting groove 203, such that the fingerprint identification module 30 transmits and acquires the optical signal through the light-transmitting area 103.

Figure 4:
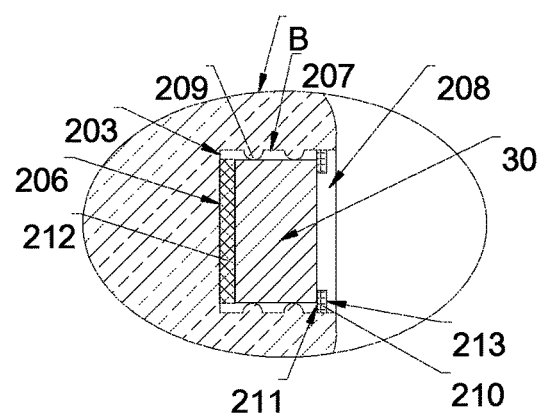
FIG. 4 is a partially enlarged view of an electronic device according to an embodiment of the present disclosure.

FIG. 4 illustrates an optional embodiment, the mounting groove 203 has the opening towards the outside of the housing 20, and further includes a bottom wall 206 and a side wall 207. The bottom wall 206 is opposite to the opening 208, the side wall 207 extends out from the bottom wall 206, and the fingerprint identification module 30 is fitted to the bottom wall 206. The fingerprint identification module 30 can be adhered to the bottom wall 206. It could be understood that the shape and size of the mounting groove 203 is not limited in this application.

Optionally, the side wall 207 is provided with an abutting portion 209, the abutting portion 209 extends from the side wall 207 and abuts against the periphery of the fingerprint identification module 30 to enhance installation stability of the fingerprint identification module 30 in the mounting groove 203, thereby improving identification efficiency of the fingerprint identification module 30. For example, the abutting portion 209 can be a bump, and the side wall 207 can be provided with a plurality of bumps.

In a specific embodiment, when the flexible display screen 10 covers the side face 202, the flexible display screen 10 is substantially parallel to the side face 202. A certain relative position relationship is provided between a signal-acquiring surface of the fingerprint identification module 30 and a surface of the fingerprint identification module 30 that is fitted to the bottom wall 206, for example, a parallel relationship or a predetermined included angle. Optionally, the signal-acquiring surface of the fingerprint identification module 30 is parallel to the surface of the fingerprint identification module 30 that is fitted to the bottom wall 206. Then, by arranging the bottom wall 206 parallel to the side face 202, it is possible to make the signal-acquiring surface of the fingerprint identification module 30 parallel to the flexible display screen 10, such that the fingerprint identification module 30 is able to better acquire the optical signal transmitted through the flexible display screen 10, and the fingerprint identification module 30 has higher identification accuracy.

Optionally, the depth of the mounting groove 203 can be greater than the thickness of the fingerprint identification module 30 in an axial direction of the mounting groove 203. In such a case, the fingerprint identification module 30 cannot only be accommodated in the mounting groove 203 completely, but also define a gap cooperatively with the side face 202 to reduce assembly difficulty and reserve space for other parts to be assembled.

As an optional embodiment, based on the above embodiment, referring to FIG. 4, the housing 20 further includes a position-limiting block 210 protruding from the side wall 207 of the mounting groove 203, the position-limiting block 210 has a first position-limiting surface 211 facing the bottom wall 206, and a surface of the fingerprint identification module 30 away from the bottom wall 206 abuts against the first position-limiting surface 211.

In an embodiment, the first position-limiting surface 211 is configured to limit a position of the fingerprint identification module 30 in a direction towards the opening 208 of the mounting groove 203, and by the arrangement of the first position-limiting surface 211, the installation stability of the fingerprint identification module 30 in an axial direction of the mounting groove 203 is enhanced, and the identification efficiency of the fingerprint identification module 30 is improved.

In an embodiment, the position-limiting block 210 is deformable to a certain extend under the action of external forces. The position-limiting block 210 is deformed due to an external force, and thus the fingerprint identification module 30 is installed in the mounting groove 203. When the external force is removed, the position-limiting block 210 returns to its original shape. The arrangement of the position-limiting block 210 helps to reduce the assembly difficulty of the fingerprint identification module 30.

Optionally, the bottom wall 206 of the mounting groove 203 is provided with a pressing member 212. The pressing member 212 is deformed under the action of external forces. The pressing member 212 is configured to press the fingerprint identification module 30 onto the first position-limiting surface 211. In such a case, the bottom wall 206, the pressing member 212 and the first position-limiting surface 211 are fitted to each other to limit the position of the fingerprint identification module 30 well. Meanwhile, the pressing member 212 can absorb part of machining tolerance to reduce the assembly difficulty of the fingerprint identification module 30.

Specifically, the pressing member 212 is an elastic member, such as a spring, foam, rubber or the like. Certainly, in other embodiments, the pressing member 212 can be a flexible member, as long as the pressing member 212 can be fitted to and press the fingerprint identification module 30.

Figure 5:
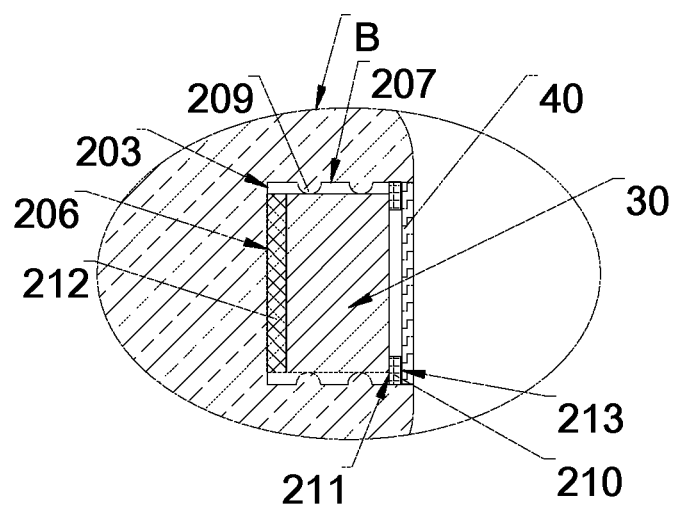
FIG. 5 is a partially enlarged view of an electronic device according to another embodiment of the present disclosure.

As an optional embodiment, based on the above embodiment, referring to FIG. 5, the electronic device 100 further includes a light-transmitting cover plate 40, and the light-transmitting cover plate 40 covers the opening 208 of the mounting groove 203. The light-transmitting cover plate 40 is provided at the opening 208 of the mounting groove 203, and specifically can be provided in the opening 208 of the mounting groove 203 or outside the opening 208 of the mounting groove 203. The light-transmitting cover plate 40 also serves to keep out dust and water stains and protect the fingerprint identification module 30 in the mounting groove 203 from damage or the like, apart from allowing the optical light for fingerprint identification to transmit. This embodiment can be implemented alone or in combination with the above embodiments.

Further, the color of the light-transmitting cover plate 40 is identical or similar to the color of the side face 202, that is, it is difficult for the user to distinguish the color difference between the light-transmitting cover plate 40 and the side face 202 with the naked eye, so as to avoid visual color difference, thereby hiding the mounting groove 203 and improving an overall visual effect of the electronic device 100.

Figure 6:
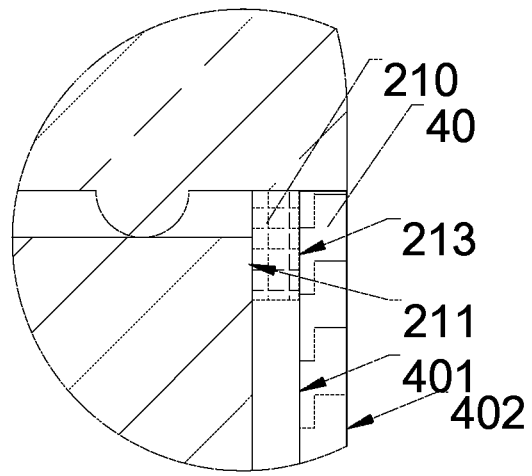
FIG. 6 is a partially enlarged view of FIG. 5.

FIG. 6 illustrates that the position-limiting block 210 has a second position-limiting surface 213 on the side wall 207 of the mounting groove 203, and the second position-limiting surface 213 faces the opening 208 of the mounting groove 203. The light-transmitting cover plate 40 has a first surface 401, and the first surface 401 faces the bottom wall 206 and abuts against the second position-limiting surface 213. The second position-limiting surface 213 is configured to limit a position of the light-transmitting cover plate 40 in a direction towards the bottom wall 206, and by the arrangement of the second position-limiting surface 213, installation stability of the light-transmitting cover plate 40 in the mounting groove 203 in the axial direction is enhanced.

Optionally, the light-transmitting cover plate 40 can be attached to the outside of the opening 208 of the mounting groove 203, or be located in the mounting groove 203. When the light-transmitting cover plate 40 is mounted in the mounting groove 203, the size of the light-transmitting cover plate 40 can be substantially the same as the size of the opening 208 of the mounting groove 203, such that the light-transmitting cover plate 40 is just mounted in the mounting groove 203. In such a case, the periphery of the light-transmitting cover plate 40 can be adhered to the side wall 207 of the mounting groove 203 to fix the light-transmitting cover plate 40 in the mounting groove 203.

Further, the light-transmitting cover plate 40 also has a second surface 402 opposite to the first surface 401, and the second surface 402 is flush with the side face 202. The first surface 401 is parallel to the second surface 402. Since the signal-acquiring surface of the fingerprint identification module 30 is parallel to the side face 202, the signal-acquiring surface of the fingerprint identification module 30 is also parallel to the first surface 401 and the second surface 402, such that the optical signal emitted from and acquired by the fingerprint identification module 30 can be directly transmitted through the light-transmitting cover plate 40 rather than being refracted by the first surface 401 and the second surface 402, so as to reduce loss of the optical signal and improve fingerprint identification accuracy and efficiency.

When the fingerprint identification module 30 is exposed out of the flexible display screen 10, the finger can be directly placed on the second surface 402 to perform the fingerprint identification. The flush arrangement between the second surface 402 and the side face 202 can increase comfort when the finger is placed on the second surface 402.

When the movable portion 102 is bent relative to the fixed portion 101, the flexible display screen 10 is fitted to the second surface 402 and the side face 202. In this way, the flexible display screen 10 is parallel to the second surface 402, reducing the optical signal loss. The flush arrangement between the second surface 402 and the side face 202 can increase the fit flatness of the flexible display screen 10 and improve the fingerprint identification accuracy.

In the electronic device 100 according to embodiments of the present disclosure, the housing 20 further includes a mainboard, a power supply and other components (not illustrated). The fingerprint identification module 30 is electrically coupled to the mainboard. The mainboard is electrically coupled to the power supply. The mainboard, the power supply, and the fingerprint identification module 30 cooperate to realize the fingerprint identification function of the electronic device 100. The specific structures, position, connection and control relationships of these components can have a variety of implementations, which are not limited herein.

The embodiments of the present disclosure are described in detail above. Specific examples are used herein to describe the principles and implementations of the present disclosure. The description of the above embodiments is merely used to help understand the method and core idea of the present disclosure; meanwhile, those skilled in the art can make modifications to the specific implementations and the application scope according to the idea of the present disclosure. In conclusion, the content of the description should not be construed as limiting the present disclosure.

What is claimed is:

1. An electronic device, comprising a flexible display screen, a fingerprint identification module and a housing, the housing having a top face and a side face connected with each other, the side face defining a mounting groove, the fingerprint identification module being accommodated in the mounting groove, the flexible display screen comprising a fixed portion and a movable portion connected with each other, the fixed portion being fitted to the top face, and the movable portion extending beyond the top face,
wherein when the movable portion is bent relative to the fixed portion, the movable portion covers the side face and the fingerprint identification module performs fingerprint identification through the flexible display screen; when the movable portion is spread out relative to the fixed portion, the fingerprint identification module is exposed out of the flexible display screen, such that a finger is fitted to the side face to perform the fingerprint identification.

2. The electronic device according to claim 1, wherein the movable portion has a light-transmitting area, and when the movable portion covers the side face, the light-transmitting area is right opposite to the mounting groove, such that the fingerprint identification module transmits and acquires an optical signal through the light-transmitting area.

3. The electronic device according to claim 1, wherein the side face comprises a bottom face and a peripheral face, the bottom face and the top face are arranged opposite to each other, and the peripheral face is connected between the top face and the bottom face.

4. The electronic device according to claim 1, wherein the mounting groove comprises an opening, a bottom wall and a side wall, the opening faces an exterior of the housing, the bottom wall is opposite to the opening, the side wall extends out from the bottom wall, and the fingerprint identification module is fitted to the bottom wall.

5. The electronic device according to claim 4, wherein the side wall of the mounting groove is provided with a position-limiting surface facing the bottom wall, and the fingerprint identification module has a surface away from the bottom wall abutting against the position-limiting surface.

6. The electronic device according to claim 4, wherein the side wall is provided with an abutting portion, and the abutting portion extends from the side wall and abuts against the periphery of the fingerprint identification module.

7. The electronic device according to claim 6, wherein the abutting portion is a bump, and the side wall is provided with a plurality of bumps.

8. The electronic device according to claim 4, further comprising a light-transmitting cover plate, and the light-transmitting cover plate covers the opening of the mounting groove.

9. The electronic device according to claim 8, wherein the light-transmitting cover plate is mounted in the mounting groove, and the periphery of the light-transmitting cover plate is adhered to the side wall of the mounting groove.

10. The electronic device according to claim 8, wherein the light-transmitting cover plate has a color same as a color of the side face to hide the mounting groove.

11. The electronic device according to claim 8, wherein the side wall of the mounting groove is provided with another position-limiting surface facing the opening of the mounting groove, the light-transmitting cover plate has a surface facing the bottom wall, and the surface abuts against the another position-limiting surface.

12. The electronic device according to claim 11, wherein the light-transmitting cover plate further has another surface opposite to the surface, and the another surface is flush with the side face.

13. The electronic device according to claim 12, wherein when the movable portion is bent relative to the fixed portion, and the movable portion is fitted to the another surface and the side face.

14. The electronic device according to claim 12, wherein the fingerprint identification module has a signal-acquiring surface parallel to the side face.

15. An electronic device, comprising: a flexible display screen, fingerprint identification modules and a housing, the housing having a top face, a peripheral face and a bottom face connected with each other sequentially, the peripheral face and the bottom face each defining a mounting groove, the fingerprint identification modules being accommodated in mounting grooves, the flexible display screen comprising a fixed portion and a movable portion connected with each other, the fixed portion being fitted to the top face, and the movable portion extending beyond the top face.

16. The electronic device according to claim 15, wherein when the movable portion is bent relative to the fixed portion and covers the peripheral face and the bottom face, the flexible display screen is parallel to the peripheral face.

17. An electronic device, comprising: an organic light-emitting diode display panel, a fingerprint identification module and a housing, the housing having a top face and a side face connected with each other, the side face defining a mounting groove, the fingerprint identification module is accommodated in the mounting groove, the organic light-emitting diode display panel comprising a fixed portion and a movable portion connected with each other, the fixed portion being fitted to the top face, the movable portion extending beyond the top face, and the fingerprint identification module having a signal-acquiring surface parallel to the organic light-emitting diode display panel.

18. The electronic device according to claim 17, wherein depth of the mounting groove is greater than thickness of the fingerprint identification module in an axial direction of the mounting groove.

19. The electronic device according to claim 18, wherein the mounting groove has a bottom wall and a side wall, the side wall is provided with a position-limiting block protruding from the side wall.

20. The electronic device according to claim 19, wherein the bottom wall is provided with a deformable pressing member, the deformable pressing member is configured to press the fingerprint identification module onto the position-limiting block.

* * * * *